United States Patent [19]
Folkens

[11] Patent Number: 5,690,304
[45] Date of Patent: Nov. 25, 1997

[54] ADJUSTABLE MOUNTING SYSTEM

[75] Inventor: Jerry D. Folkens, DuPage County, Ill.

[73] Assignee: Vibro/Dynamics Corp., Broadview, Ill.

[21] Appl. No.: 634,435

[22] Filed: Apr. 18, 1996

[51] Int. Cl.⁶ .................................................. F16M 11/24
[52] U.S. Cl. .............................. 248/188.4; 248/188.2; 248/404; 248/615; 248/632; 248/634; 248/638
[58] Field of Search ........................ 248/180.1, 188.2, 248/188.3, 188.4, 404, 550, 615, 632, 634, 638; 254/1, 129 A

[56] References Cited

U.S. PATENT DOCUMENTS

| | | | |
|---|---|---|---|
| 3,332,647 | 7/1967 | Young | 248/656 X |
| 3,455,526 | 7/1969 | Orii | 248/188.4 |
| 3,592,423 | 7/1971 | Mui | 248/188.4 X |
| 3,931,947 | 1/1976 | Tagnon | 248/188.4 X |
| 4,047,427 | 9/1977 | Young | 73/141 A |
| 4,226,401 | 10/1980 | Coulombe | 254/1 X |
| 4,265,136 | 5/1981 | Riegler et al. | 248/550 X |
| 4,489,991 | 12/1984 | Delam | 248/638 X |
| 4,846,436 | 7/1989 | Young et al. | 248/542 |
| 5,127,622 | 7/1992 | Whelpley et al. | 248/638 X |
| 5,360,195 | 11/1994 | Young | 248/188.4 X |
| 5,397,103 | 3/1995 | Watson | 254/1 |

Primary Examiner—Leslie A. Braun
Assistant Examiner—Richard M. Smith
Attorney, Agent, or Firm—R. Jonathan Peters

[57] ABSTRACT

A mounting system comprising an adjustment means adaptable for assuming a load, a supporting member and a bearing member in spaced relationship, and a compressible resilient member is disposed in supporting relationship with the bearing member. A portable fluidic cylinder is adaptable for connection and disconnection to a fluid source means, and an opening between the bearing member and the supporting member, such as an opening in a side wall of the supporting member, is of sufficient size to accommodate the cylinder. The fluidic cylinder is portable and adaptable for interposition between the bearing member and the supporting member and extendable to space the supporting member in a direction away from the bearing member without reducing deflection or compression of the resilient member, thereby permitting adjustment of extremely heavy loads. After any desired adjustment has been accomplished, the fluidic cylinder is deactivated and subsequently removed from the mounting system, without reducing deflection of the resilient member.

8 Claims, 4 Drawing Sheets

ADJUSTABLE MOUNTING SYSTEM

FIELD OF THE INVENTION

This invention relates to an adjustable mounting system used for adjusting a load. In its more specific aspect, this invention relates to an adjustable mounting system for adjusting, assuming, positioning, leveling, or supporting a load member facilitated by a portable fluidic cylinder.

BACKGROUND AND PRIOR ART

Extremely heavy loads such a machinery, equipment, presses, etc., are subjected to shock and vibration and are susceptible to misalignment due to these forces and/or due to settling including settling of the foundation. Proper alignment, including leveling, flatness, and the like, is essential in order to operate efficiently, economically and safely. The prior art discloses a number of adjustable mountings to correct for out-of-level or out-of-flatness conditions. This prior art includes U.S. Pat. Nos. 3,332,647, 4,047,427, and 4,135,312 all to Young; and 4,846,436 to Young et al., which disclose an adjustment member engagable with a support member or cover plate for the machine footing and maintained in spaced relationship from a bearing member or plate.

In the aforesaid U.S. Pat. No. 4,846,436, a lifting means, e.g., hydraulic cylinder 34, arranged integrally with the mounting, is disposed between the support member 16 and bearing member or plate 14, and when actuated relieves at least a portion of the load assumed by the adjustment member 20. The adjustment member now can be turned or rotated to adjust the out-of-level condition, and once corrected, the cylinder can be drained or deactivated and the load returned to the adjustment member. In accordance with the teachings of this patent, the hydraulic cylinder is first actuated to lift at least a portion of the load, the adjustment member then adjusted, and the hydraulic cylinder is then deactivated. Thus, the hydraulic cylinder is actuated only long enough to make an adjustment. When the adjustment has been completed, the hydraulic cylinder is deactivated, and the load is returned to the adjustment member. It will be observed from this patent disclosure that the support member 16 has downwardly depending side walls or skirt, and the fluidic cylinder 34 is contained within the mounting.

U.S. Pat. No. 4,489,991 to Delam discloses a support system for machines such as a turbogenerator connected by a common drive shaft and arranged on a base plate comprising a hydraulic cylinder and spring means for regulating or adjusting any spatial relationship between members, and then a blocking device or wedge is inserted to fill the space and decrease the load on the regulating members. U.S. Pat. No. 3,807,034 to Pevzner et al relates to a screw mechanism that adjusts the elevation of two adjacent corners of a table simultaneously and equally by means of one control. The hydraulic cylinder relieves the load on the screw mechanism to make it easier to turn. Here again, in both of these patents the lifting means or hydraulic cylinder is contained within the mounting system.

Although mounting systems such as disclosed in the foregoing prior art have been successful commercially, it is the purpose of this invention to provide a mounting system which is more useful, can be used readily in the field, and is less expensive.

SUMMARY OF THE INVENTION

In accordance with the present invention, there is provided an adjustable mounting system for assuming or bearing a load member in a desired condition and is simple, fast, and inexpensive, thereby overcoming the disadvantages of prior art systems which requires a lifting means or fluidic cylinder contained within or integral with the mount. Thus, the mounting system of this invention comprises a supporting member engagable with at least a portion of the load, and a bearing member disposed beneath the support member and spaced therefrom. An adjustment means, adaptable for assuming a load, has a section intermediate the support member and the bearing member for regulating and maintaining the spatial relationship between these two members. An actuable load-relieving means or fluidic cylinder temporarily reduces or relieves at least a portion of the load on the adjustment means, thereby permitting adjustment of extremely heavy loads. The input force for effecting adjustment is nominal relative to the load, and thus it is possible to adjust the positioning of extremely heavy machinery, equipment, or structures which may weigh a hundred tons or more. For example, machines weighing several millions of pounds can be raised, lowered or leveled simply by manually applied forces of a few pounds to the adjustment means. As used herein and in the appended claims, adjustment of a load is intended to include positioning, leveling, assuming, bearing, supporting, or the like, of a load.

A compressible resilient member is disposed in supporting relationship with the bearing member. The supporting member, which has a substantially planar surface, is disposed above and spaced from the bearing member, and may have downwardly depending side walls which are disposed above the lowermost surface of the resilient member. A portable fluidic cylinder is adaptable for connection and disconnection to a fluid source means, and an opening between the supporting member and the bearing member, such as an opening in at least one of the side walls of the supporting member, is of sufficient size to accommodate the cylinder. The fluid source means may comprise a mobile unit having a reservoir for the fluid, a pump for delivering pressurized fluid to the cylinder, and connecting elements including conduits which can be connected and disconnected at the mounting site. The fluidic cylinder is portable and adaptable for interposition between the bearing member and the supporting member and extendable to space the supporting member in a direction away from the bearing member without reducing deflection or compression of the resilient member. After any desired adjustment has been accomplished, the fluidic cylinder is deactivated, disconnected from the fluid source, and subsequently removed from the mounting system, again without reducing deflection of the resilient member.

A mounting system may include two or more fluidic cylinders, depending largely upon the arrangement or configuration of the adjustment member, as described hereinbelow in detail. It is significant that by reason of my invention a fluidic cylinder means can be utilized for leveling a machine or the like, and these same fluidic cylinder means can be used for several machines. Thus, because the fluidic cylinder is portable, the cylinder can be readily used in the field at several locations, and therefore reduces the costs or expense of the mounting system.

DETAILED DESCRIPTION OF THE INVENTION

Figure 1:
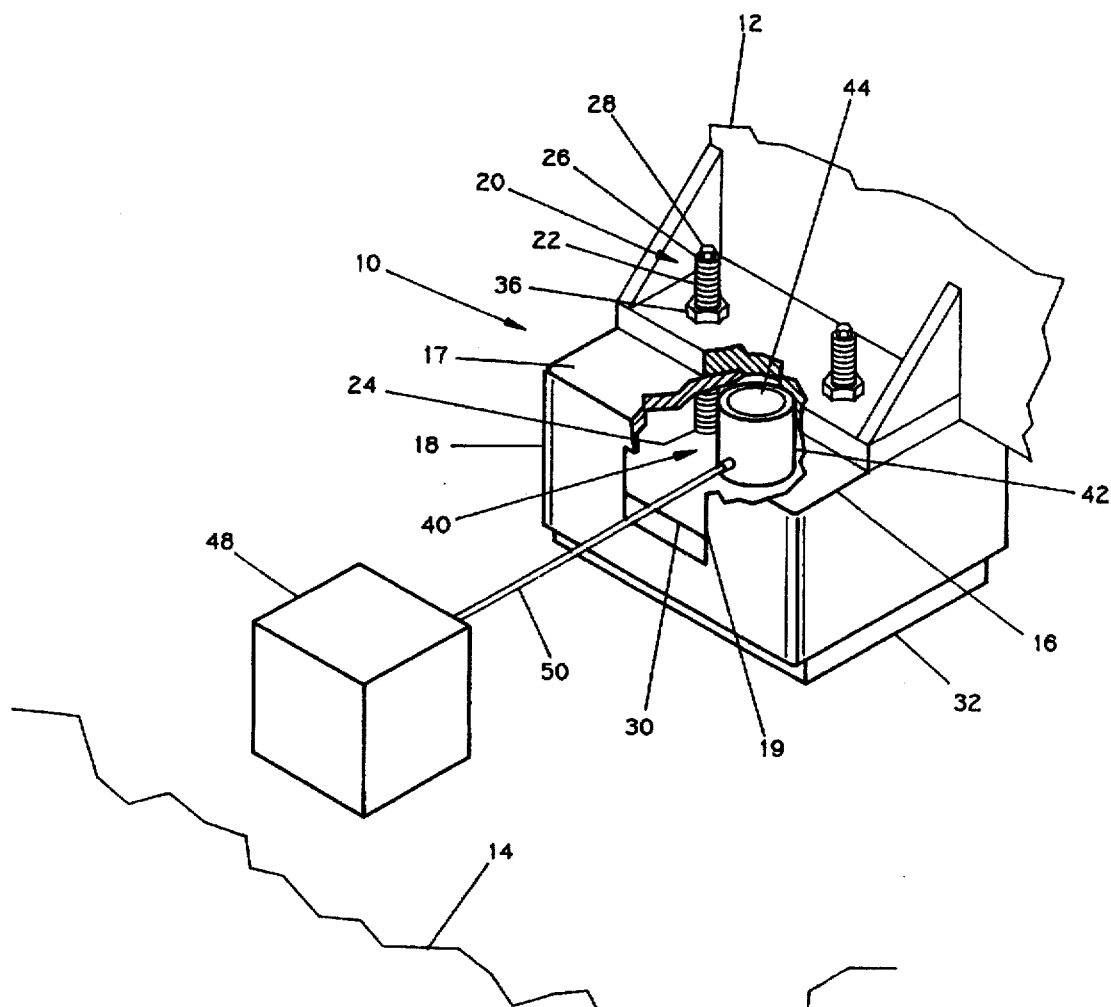
FIG. 1 is a diagrammatic, perspective view of an adjustable mounting system used in conjunction with a machine footing and embodying the features of the present invention.

FIG. 1 diagrammatically illustrates an adjustable mounting system for load bearing members, which incorporates the features of the invention. In the drawings, wherein like reference numerals designate similar parts throughout, there is illustrated a machine mounting system, indicated generally by the numeral 10, such as to correct for out-of-level and/or out-of-flatness condition. Load member 12, shown in fragmentary view, which may be a corner foot of a heavy machine, is supported by the mount 10 and is adjustably spaced from a base member 14, such as the floor of a building. As shown in the drawings, the adjustable mounting system includes a supporting member 16 having a substantially planar top surface 17 and downwardly depending side walls 18, and is of sufficient size for supporting the load 12, e.g., machine footing. At least one wall 18 is provided with one or more openings 19, or opposed walls 18 may be provided with non-aligned openings 19, for reasons described herein below in detail. Although there is illustrated a single adjustment unit, it should be understood that the same unit can be used at each of the various mounting points of a machine, e.g. at each of the four corner feet of a machine, for leveling and fine-tuning the distribution of support for the entire machine. Where desired, the supporting member 16 may be integral with the machine footing, which typically has one side, or opposed sides, open or nearly completely open.

An adjustment member 20, adaptable for bearing the load, and having its longitudinal axis substantially transverse to the load, comprises an externally threaded, cylindrical body portion or section 22 of a first diameter extending from a bearing portion 24 at the bottom end thereof and terminating at the top or upper portion with annular shoulder 26 and upwardly extending shank 28 of a reduced or second diameter, such as a wrench engagement shank which may be utilized for turning the adjustment means. The adjustment member 20 threadedly engages the supporting member 16 which is of sufficient size for supporting the load 12, e.g. machine footing. The bottom end 24 of the adjustment member 20 seats on a bearing member 30 spaced from the base 14 (e.g. floor) by a resilient member 32, such as elastomeric cushions or springs, disposed on the base member 14.

Figure 3:
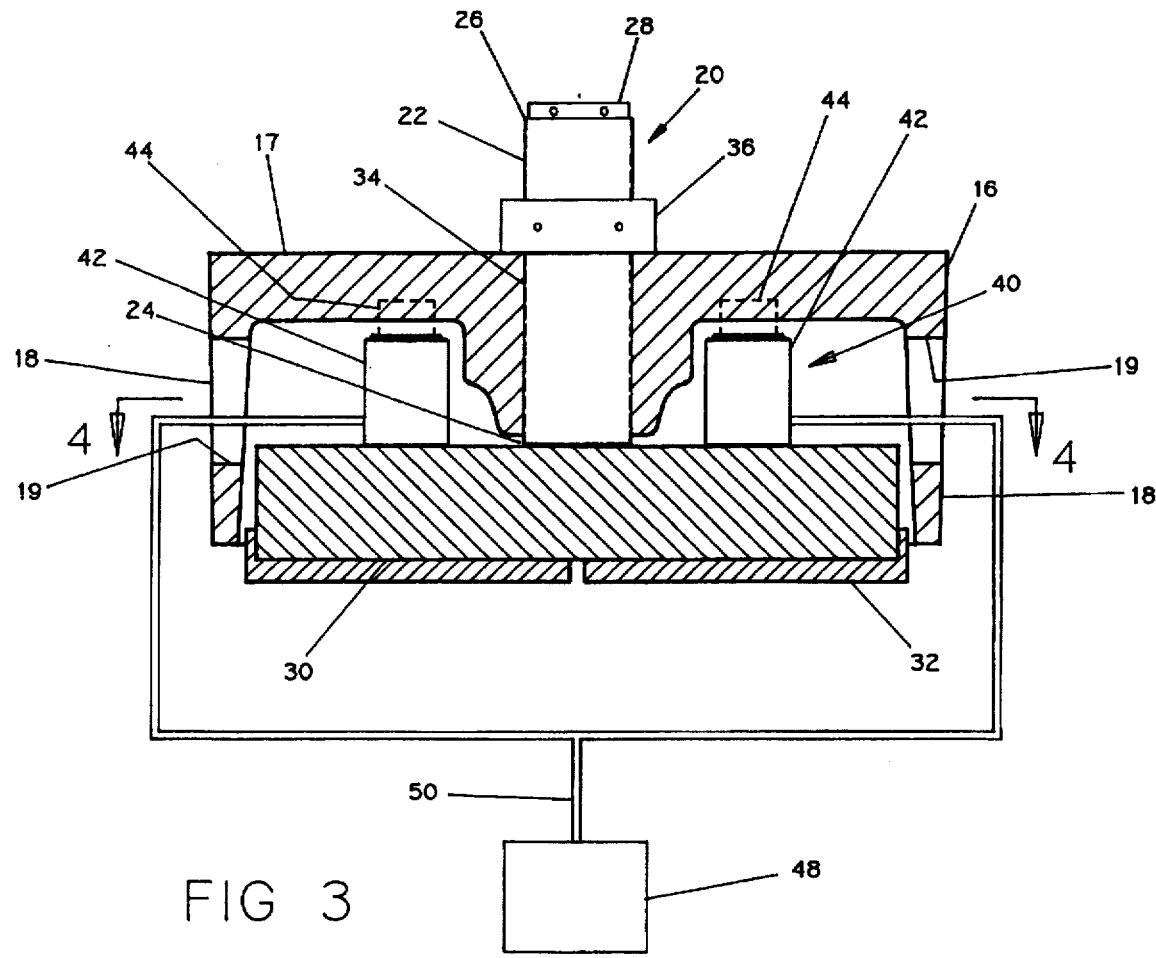
FIG. 3 is an elevational view in cross-section of the mounting system of FIG. 2.

Member 32, which is ordinarily compressible and resilient, rests on the floor 14 of a building in which a piece of machinery is located (not shown) so that one foot 12 of the machine may be positioned on the mount 10. The cushion member 32 is disposed in immediate supporting relationship below the bearing member or plate 30. The supporting member 16 is arranged or disposed above the bearing member 30, and normally is of such a size that the foot 12 of a machine to be supported thereon will seat or engage the top or uppermost planar surface thereof. As best shown in FIG. 3, supporting member 16 is provided with a centrally disposed threaded aperture 34 for threaded engagement with the externally threaded portion 22 of adjustment member 20. In this manner, adjustment member 20 is rotatably engagable with the supporting member 16. It will be observed that because adjustment member 20 is seated on a stationary member, e.g., bearing member 30, and also threadedly engaged with the supporting member, rotation of the adjustment member 20 will vary the distance or space between the machinery supporting member 16 and the bearing member 30, i.e., will raise or lower load member 12 and thereby correct for out-of-level or out-of-flatness condition. A locking nut 36 is also provided to fix the adjustment member 20 in place relative to the machinery supporting member 16 upon adjustment of the adjustment member 20.

It further will be observed that the supporting member 16 is spaced from the building floor 14 which supports the elastomeric cushion 32. Thus, any vibrations transmitted through the floor 14 (or foundation) below the cushion member 32 will be dampened and not fully transmitted to any equipment resting on the machinery supporting member 16. Similarly any vibration or impact forces generated by the operation of a machine resting on member 16 will be only partially transmitted to the floor through the mount 10 and adjustment member 20.

Figure 2:
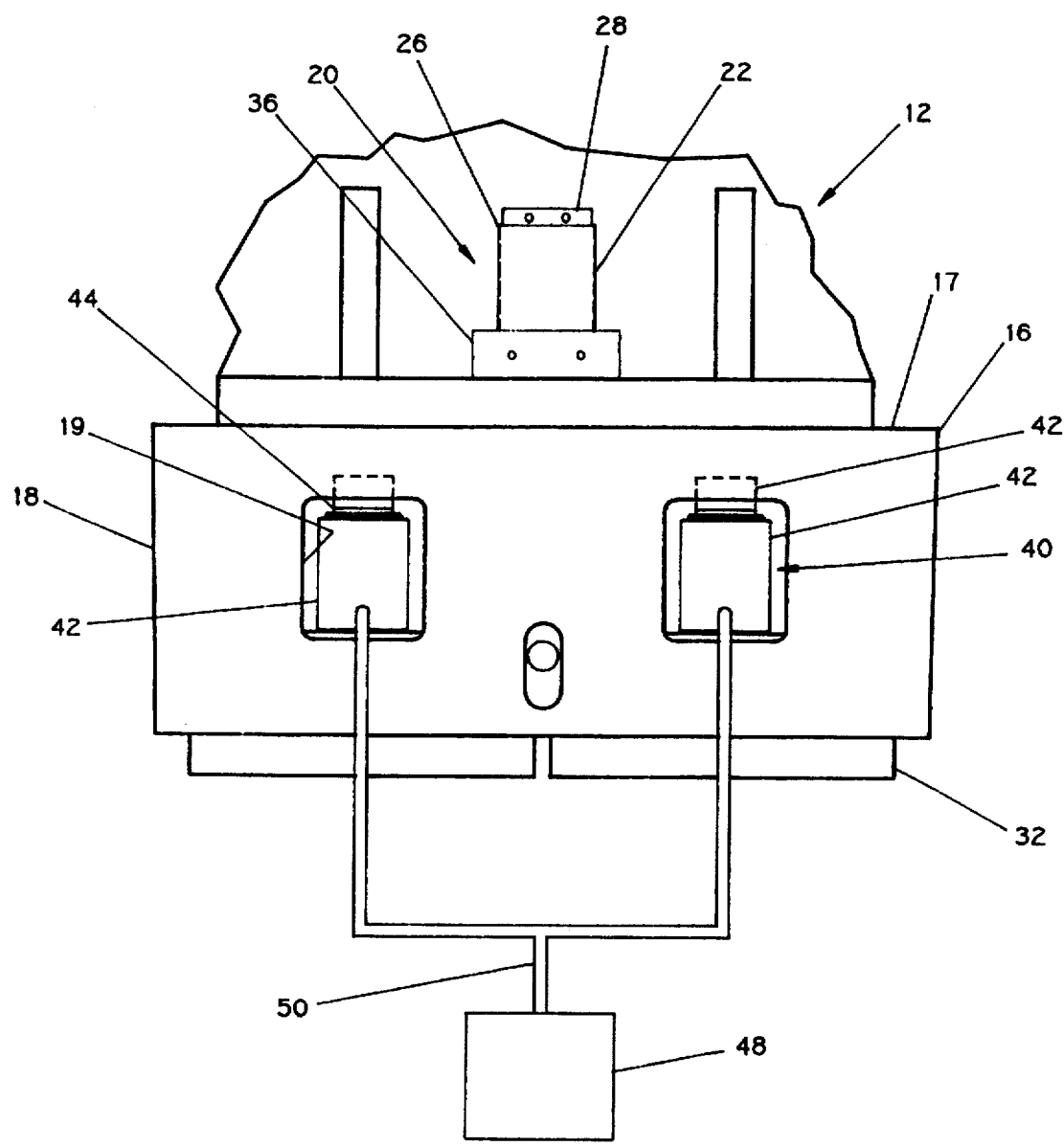
FIG. 2 is a fragmentary elevational view showing a mounting system similar to that of FIG. 1 but modified to show a second fluidic cylinder.

As stated above, at least one of the downwardly depending walls 18 is provided with one or more openings 19 of sufficient size to accommodate or permit positioning, arranging or posturing of a portable fluidic cylinder, indicated generally by the numeral 40, in the mounting system 10. That is, the fluidic cylinder 40 is portable in contrast to being contained in or integral with the mount as shown in the prior art, and therefore the fluidic cylinder can be utilized when an adjustment is required and subsequently removed from the mounting system after the adjustment has been accomplished. Fluidic cylinder means, indicated generally by the numeral 40, such as a hydraulic cylinder having a cylinder 42 and piston 44 of conventional design and operation, is inserted through opening 19 of wall 18, and is seated on bearing member 30 adjacent the adjustment member 20 and positioned beneath supporting member 16 and oriented to engage its under-surface, e.g. bottom. Where desired, opposed walls 18 may be provided with nonaligned openings so that fluidic cylinders are inserted through the openings 19 from opposite directions, whereby the cylinders are symmetrically arranged on the bearing member 30 and about the adjustment member 20, as described herein below in more detail. Fluidic cylinder 30 is in fluid communication with fluid source means 48, typically comprising a reservoir for the fluid (e.g., oil) and a motor operated pump, via conduit or line 50 for delivering pressurized fluid. A single machine mount may include a plurality of fluidic cylinders 40 interposed between the bearing member and the supporting member, as shown in FIGS. 2 and 3 and discussed hereinbelow.

Thus, when adjustment of the load 12 is desired, the fluidic cylinder 40 is inserted through opening 19, and connected to the fluid source means 48 via line or hose 50. Line 50 is a conventional hydraulic hose, which are flexible and steel braided to withstand relatively high pressures. Where desired, the fluid source means may be a mobile unit. The cylinder can be actuated, and a load-relieving force is exerted against the load member 12, e.g. against the bottom surface of the supporting member 16, thereby reducing or relieving the load on adjustment member 20. The adjustment member 20 then can be rotated to raise or lower the load and thereby correct the level or flatness condition. After the desired adjustment has been completed, the fluid source means is deactivated (i.e., the pump is shut off) thereby stopping the delivery of hydraulic fluid to the cylinder. The fluid exits from the hydraulic cylinder, and the piston retracts thereby returning all the load to the adjustment member 20.

After the cylinder is deactivated, it is disconnected from the fluid source means and removed from the mounting system. It thus will be observed that a mounting system utilizing a portable fluidic cylinder is advantageous in that the one unit is adaptable for use in the field for more than one mounting system, thereby substantially reducing costs.

If desired, more than one fluidic cylinder means 40 may be utilized at each location, e.g. each corner foot of a machine, in which case all of the cylinders can be connected by suitable connecting elements with the control member of the fluid source means. (See FIGS. 2 and 3.) In this alternative embodiment, the side wall 18 is provided with an opening 19 to accommodate each fluidic cylinder 40, and the cylinders are arranged symmetrically about the adjustment member 20. A plurality of fluidic cylinders provides a more uniform distribution of the load-relieving force on both sides of the adjustment member. That is, it may be desirable to have a plurality of cylinder members 40 interposed between the bearing member 30 and the supporting member 16, arranged as shown in FIGS. 2 and 3, so that the downward forces applied by the plurality of cylinders to the bearing plate 30 are symmetrical about the center of the resilient member 32 to prevent uneven loading on the resilient member 32 and tilting of the bearing member 30. When there is a plurality of cylinders 40 within a single mounting system 10, arranged as shown in FIGS. 2 and 3, each of the cylinders is connected through a high pressure line 50 having suitable connecting means and thence to a source 48 of hydraulic fluid. Thus, all of the cylinders may be operated simultaneously from the pressure fluid source.

Figure 4:
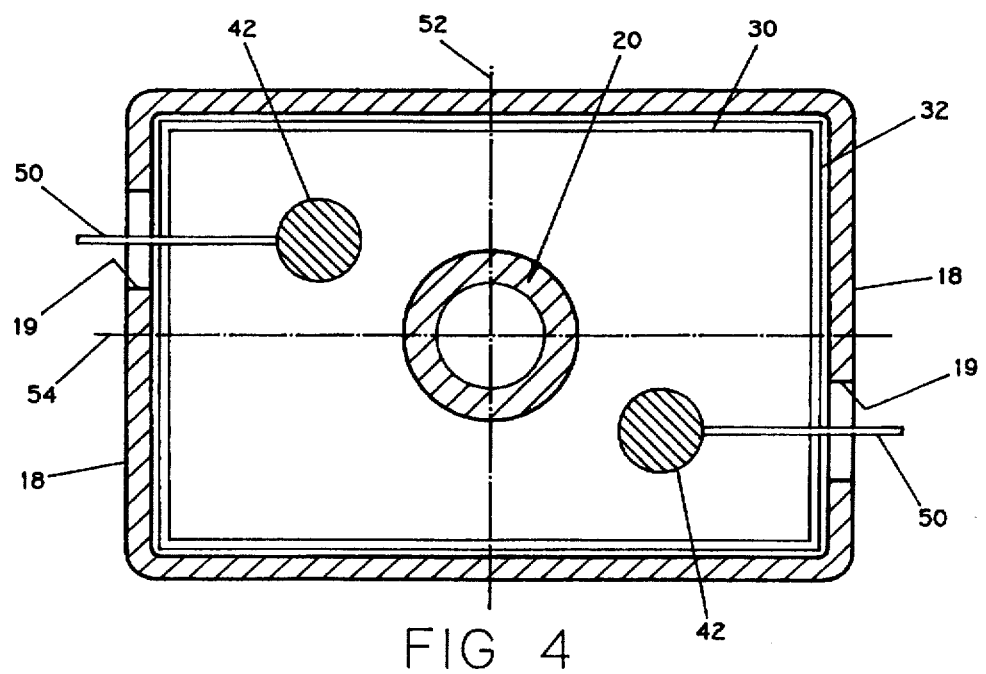
FIG. 4 is plan view in cross-section along line 4—4 of FIG. 3.

In an alternative embodiment, as shown in FIG. 4, opposed side walls 18 of the support member 16 are provided with nonaligned openings. As illustrated, there is an opening 19 in one pair of the opposed walls 18, but where desired, additional openings may be provided in the other pair of opposed walls. The openings are not in alignment with respect to the central axes 52 and 54 of the support member substantially normal to the opposed walls. Thus, when a fluidic cylinder is inserted through each opening, the cylinders are arranged on each side of the central axis and are positioned substantially diametrically opposite to each other (in diametrically opposite quadrants, as shown in FIG. 4) and symmetrical with respect to the adjustment member.

The fluidic cylinder 40 is arranged in series with the load as shown in the drawings, in that the cylinder is disposed intermediate the bearing member 30 (which is seated on resilient member 32) and the supporting member 16. An arrangement in series is found to be advantageous in that the machine foot is not raised because there is no change of load on the resilient member, and therefore no change of deflection (i.e., compression) of that member when the load-relieving means is actuated, and the adjustment member remains in contact with the bearing member. It thus will be observed that when the fluidic cylinder 40 is activated, an increasing upward force is brought to bear on the supporting member 16 and an equal downward force on the bearing member 30 which releases a substantial amount or all of the normal force between the sets of threads engaged between the adjustment member 20 and the support member 16 without reducing the load on or deflection (compression) of the resilient member 32. There is no reduction in deflection of the resilient member because the reduction in load on the adjustment member is achieved by transferring the load to the fluidic cylinder 40, both of which are supported on the same bearing member 30 which in turn is supported on the resilient member 32. Application of an input force or torque to rotate adjustment means 20 effects a desired adjustment.

Thus, a corner of the machine needs to be raised by only the infinitesimal amount corresponding to the reduction of the shear strain distortion in the mating threads of the adjustment member 20 and support member 16 required to permit adjustment of the adjustment member.

Figure 5:
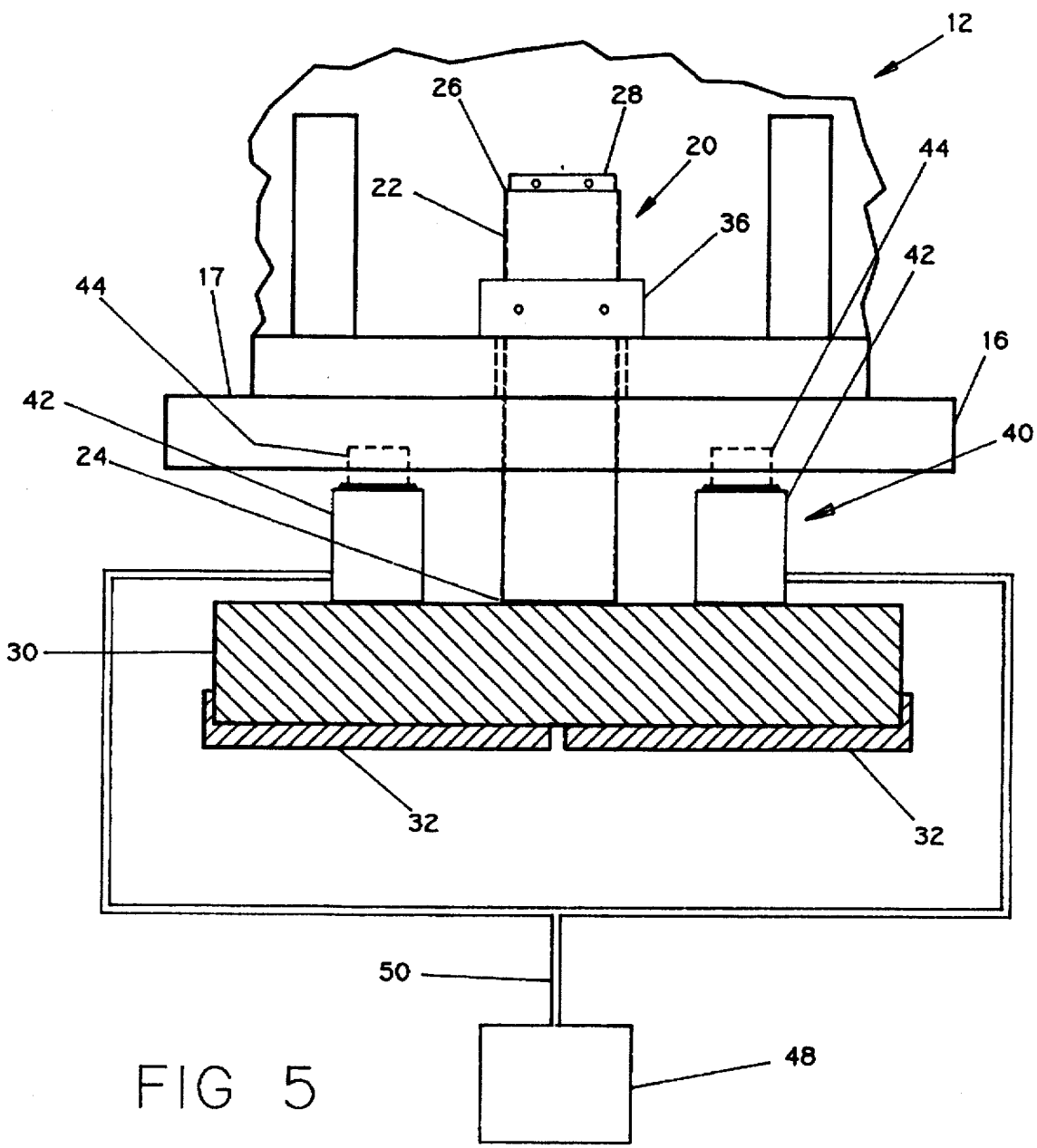
FIG. 5 is a fragmentary elevational view illustrating an alternative embodiment of the invention.

In accordance with the alternative embodiment shown in FIG. 5, the support member 16, which is engaged be the adjustment member 20, has no downwardly depending walls. Thus, there is a space or opening between the support member and bearing member, and this opening is sufficient to accommodate one or more fluidic cylinders, substantially as described above.

In accordance with the invention, it is possible to adjust the adjustment member 16 with an input force that is nominal only, e.g. by hand or a hand wrench, relative to the load, notwithstanding that the machine supported by the mounting system of the invention may weigh hundred's of tons, e.g., 1,000,000 pounds. In this manner, the load may be easily corrected for out-of-level or out-of-flatness condition, without distorting the weight distribution and without the need for extra-ordinary lifting and leveling equipment.

It will be observed that by reason of the invention numerous advantages are achieved with the adjustable mounting system for adjusting a load. Further, it should be understood that the foregoing detailed description has been given for clearness of understanding only, and no unnecessary limitations should be understood therefrom, as modifications will be obvious to those skilled in the art.

PAF—Identification of Parts

10 Mounting system
12 Load (foot of machine)
14 Base (floor)
16 Supporting member
17 Planar top surface of 16
18 Side walls of 16
19 Opening in 18
20 Adjustment member
22 Threaded section of 20
24 Bearing portion (bottom) of 20
26 Shoulder of 20
28 Shank of 20
30 Bearing member or plate
32 Resilient member
34 Threaded aperture of 16
36 Locking nut
40 Fluidic cylinder
42 Cylinder of 40
44 Piston of 40
48 Fluid source means
50 Conduit or hose
52, 54 Central axis of supporting member

What is claimed is:

1. In an adjustable mounting system, comprising (a) a bearing member, (b) a compressible resilient member disposed in supporting relationship with said bearing member, (c) a supporting member having a planar surface and disposed above and spaced from said bearing member, and (d) an adjustable member having a portion intermediate said bearing member and said supporting member and maintaining said bearing member in spaced relationship with said supporting member; the improvement comprising: at least one fluidic cylinder adaptable for connection and disconnection to a fluid source means, said fluidic cylinder being portable for interposition between said bearing member and said supporting member and extendable to spatially adjust said supporting member in a direction away from said bearing member and for subsequent removal after said adjustment without reducing deflection of said resilient member; and an opening between said bearing member and said supporting member of sufficient size to accommodate said fluidic cylinder.

2. An adjustable mounting system according to claim 1 wherein said fluid source means is a mobile source means having a reservoir for holding fluid, pump means for delivering pressurized fluid to said fluidic cylinder, and connecting elements for connecting said fluid source means to said fluidic cylinder.

3. In an adjustable mounting system, comprising (a) a bearing member, (b) a compressible resilient member disposed in supporting relationship with said bearing member, (c) a supporting member having (i) a planar surface disposed above and spaced from said bearing member, and (ii) opposed side walls depending downwardly from said planar surface and disposed above the lowermost surface of said resilient member, and (d) an adjustable member having a portion intermediate said bearing member and said supporting member and maintaining said bearing member in spaced relationship with said supporting member; the improvement comprising: at least one fluidic cylinder adaptable for connection and disconnection to a fluid source means, each of said fluidic cylinders being portable for interposition between said bearing member and said supporting member and extendable to spatially adjust said supporting member in a direction away from said bearing member and for subsequent removal after said adjustment without reducing deflection of said resilient member; and at least one opening in at least one of said side walls of sufficient size to accommodate each of said fluidic cylinders.

4. An adjustable mounting system according to claim 3 wherein said side wall has at least two openings, each for accommodating a fluidic cylinder adaptable for connection and disconnection to said fluid source means including means for activating and deactivating each of said fluidic cylinders simultaneously.

5. An adjustable mounting system according to claim 3 wherein at least one pair of said opposed side walls has an opening in each of said walls, said openings not being in alignment with respect to the central axis of the supporting member substantially normal to the opposed walls, each opening being of sufficient size for accommodating a fluidic cylinder adaptable for connection and disconnection to said fluid source means including means for activating and deactivating each of said fluidic cylinders simultaneously, whereby interpositioning of said fluidic cylinders from opposed openings provides for a substantially diametrically opposite and symmetrical arrangement of said fluidic cylinders with respect to the adjustment member.

6. An adjustable mounting system according to claim 3 wherein said fluid source means is a mobile source means having a reservoir for holding fluid, pump means for delivering pressurized fluid to said fluidic cylinder, and connecting elements for connecting said fluid source means to said fluidic cylinder.

7. An adjustable mounting system according to claim 4 wherein said fluid source means is a mobile source means having a reservoir for holding fluid, pump means for delivering pressurized fluid to said fluidic cylinder, and connecting elements for connecting said fluid source means to said fluidic cylinder.

8. An adjustable mounting system according to claim 5 wherein said fluid source means is a mobile source means having a reservoir for holding fluid, pump means for delivering pressurized fluid to said fluidic cylinder, and connecting elements for connecting said fluid source means to said fluidic cylinder.

* * * * *